United States Patent
Jones

(10) Patent No.: US 9,146,800 B2
(45) Date of Patent: Sep. 29, 2015

(54) METHOD FOR DETECTING ANOMALIES IN A TIME SERIES DATA WITH TRAJECTORY AND STOCHASTIC COMPONENTS

(71) Applicant: Mitsubishi Electric Research Laboratories, Inc., Cambridge, MA (US)

(72) Inventor: Michael J Jones, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 207 days.

(21) Appl. No.: 13/932,238

(22) Filed: Jul. 1, 2013

(65) Prior Publication Data

US 2015/0006972 A1   Jan. 1, 2015

(51) Int. Cl.
*G06F 11/00* (2006.01)
*G06F 11/07* (2006.01)

(52) U.S. Cl.
CPC .................................. *G06F 11/076* (2013.01)

(58) Field of Classification Search
CPC . G06F 11/076; G06F 11/0793; G06F 11/079; G06F 11/1048; G06F 11/1076; G06F 11/0769; G06F 12/0246; G06F 11/0724; G06F 11/0757; G06F 11/07; G06F 11/0751; G06F 11/008
See application file for complete search history.

(56) References Cited

U.S. PATENT DOCUMENTS

| | | | |
|---|---|---|---|
| 7,275,018 B2 | 9/2007 | Abu-El-Zeet | |
| 7,716,011 B2 | 5/2010 | Thibaux et al. | |
| 8,800,036 B2* | 8/2014 | Khayam et al. | 726/23 |
| 8,825,567 B2* | 9/2014 | Jiang et al. | 706/12 |
| 2004/0078171 A1 | 4/2004 | Wegerich | |
| 2008/0225738 A1* | 9/2008 | Virdhagriswaran et al. | 370/252 |
| 2011/0185422 A1* | 7/2011 | Khayam et al. | 726/23 |
| 2012/0136676 A1* | 5/2012 | Goodall et al. | 705/2 |
| 2012/0163463 A1* | 6/2012 | Edelhaeusser et al. | 375/240.16 |
| 2012/0316835 A1 | 12/2012 | Maeda | |
| 2013/0318011 A1* | 11/2013 | Jones et al. | 706/12 |
| 2014/0149806 A1* | 5/2014 | Khalastchi et al. | 714/49 |
| 2015/0058981 A1* | 2/2015 | Stolfo et al. | 726/23 |

OTHER PUBLICATIONS

Bay et al., "A Framework for Discovering Anomalous Regimes in Multivariate Time-Series Data with Local Models." Technical Report, Center for the Study of Language and Information, Stanford University, 2004.

Stephen Wegerich, "Condition based monitoring using nonparametric similarity based modeling." SmartSignal Technical Reports, 2008.

Abu-el-zeet Z.H and Patel V.C (2006). Application of Novelty Detection Techniques to Power Plant Condition Monitoring, 18th International Conference on Systems Engineering ICSE2006, Coventry, UK, Sep. 5-7, 2006.

* cited by examiner

*Primary Examiner* — Nadeem Iqbal
(74) *Attorney, Agent, or Firm* — Dirk Brinkman; Gene Vinokur

(57) ABSTRACT

A method detects anomalies in time series data by comparing universal features extracted from testing time series data with the universal features acquired from training time series data to determine a score. The universal features characterize trajectory components of the time series data and stochastic components of the time series data. Then, an anomaly is detected if the anomaly score is above a threshold.

6 Claims, 6 Drawing Sheets

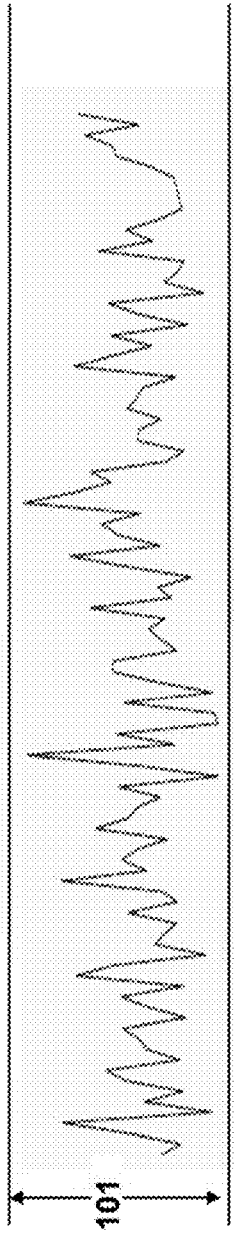 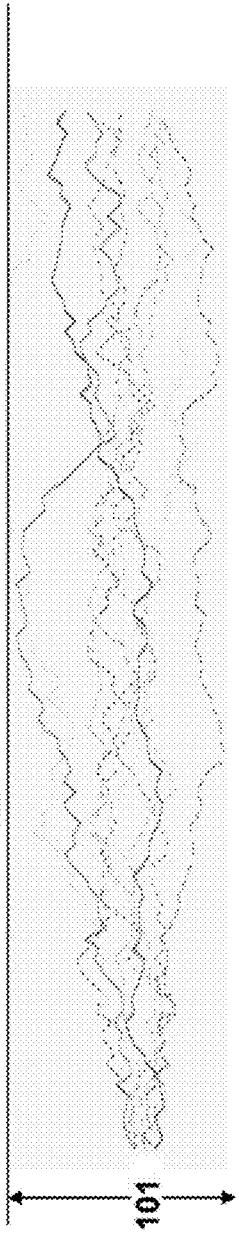 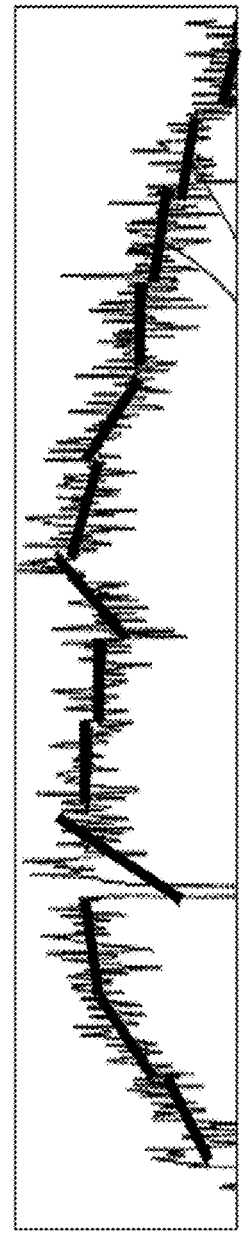
Fig. 1A Prior Art
Fig. 1B Prior Art
Fig. 1C Prior Art

METHOD FOR DETECTING ANOMALIES IN A TIME SERIES DATA WITH TRAJECTORY AND STOCHASTIC COMPONENTS

FIELD OF THE INVENTION

This invention relates generally to processing time series data, and more particularly to determining anomalies during operation of equipment from time series data.

BACKGROUND OF THE INVENTION

Time series data can be generated and analyzed for a number of applications. For example, automatic equipment monitoring can avoid costly repairs. This can be clone by analyzing time series data acquired by sensors on or near the equipment to detect anomalies that may indicate that maintenance or repair of the equipment is needed.

As shown in FIGS. 1A and 1B for typical schochastic and multivariate time series data, most prior methods for detecting anomalies simply determine values outside of a normal operating range 101.

For examples, one method assumes that multivariate time series can be modeled locally as a vector autoregressive (AR) model, see Bay et al., "A Framework for Discovering Anomalous Regimes in Multivariate Time-Series Data with Local Models," Technical Report, Center for the Study of Language and Information, Stanford University, 2004. That method first learns a distribution of AR model parameters for each time window of the training data. During testing, for each time window, the AR Model parameters are estimated and the probability of these parameters are determined from the previously learned probability distribution. The distribution learned by that method uses a restrictive autoregressive assumption. That method works well time series data with a random stochastic components.

Most methods focus on a single type of time series data for a particular application. There are very few methods that attempt a more general solution to the problem of anomaly detection in time series data.

U.S. Pat. No. 7,716,011, "Strategies for identifying anomalies in time-series data," is a model-based approach that fits spline segments to time-series data, see FIG. 1C. That method computes changes in the spline parameters and uses $L_1$ distances between the splines to detect anomalies, and $L_2$ distances to measure normal operation. This method works well on time series with a smooth trajectory.

SUMMARY OF THE INVENTION

According to embodiments of the invention, time series can be decomposed into a smooth curve and random fluctuations around the smooth curve. The the smooth curve is called the trajectory component of the time series, and the random fluctuations is called the Stochastic component of the time series. Prior art methods typically handle time series that contain only one of these components.

The embodiments provide a method for detecting anomalies in time series data. The tune series data can be acquired, e.g., from the equipment by sensors. The method detects anomalous patterns in time series data. For example, sensor data from a machine may normally produce a periodic pattern, e.g., a sine wave. If the sensor produces a constant signal, a flat line, this would be anomalous even though no values fall outside of the normal operating range. The invention models both the stochasite component of a times series as well as the trajectory component. The invention solves the problem of finding anomalies that works well with any type of time series data.

The method uses a set of universal features that summarize the time series data used for training. The universal features are distinctive element of this invention. The features are called universal because the features are designed to handle different types of time series data. Hence, the method is a feature-based approach.

According to the embodiments of the invention, a time series data source, e.g., a sensor output from a machine, can be characterized as a combination of stochastic components and trajectory components. The stochastic components produce data with random fluctuations around a moving mean or average, while the trajectory components produce a trajectory-like, smooth curve.

Prior art methods, such as ones that model the time series using an autoregressive model, only work well on stochastic time series. The universal features used by the embodiments are unique in that the features characterize both trajectory-like behavior and stochastic type of behavior of time series.

BRIEF DESCRIPTION OF THE FIGURES

FIGS. 1A, 1B and 1C are time series data processed by prior art methods.

DETAILED DESCRIPTION OF THE PREFERRED EMBODIMENTS

Method Overview

Figure 2A:
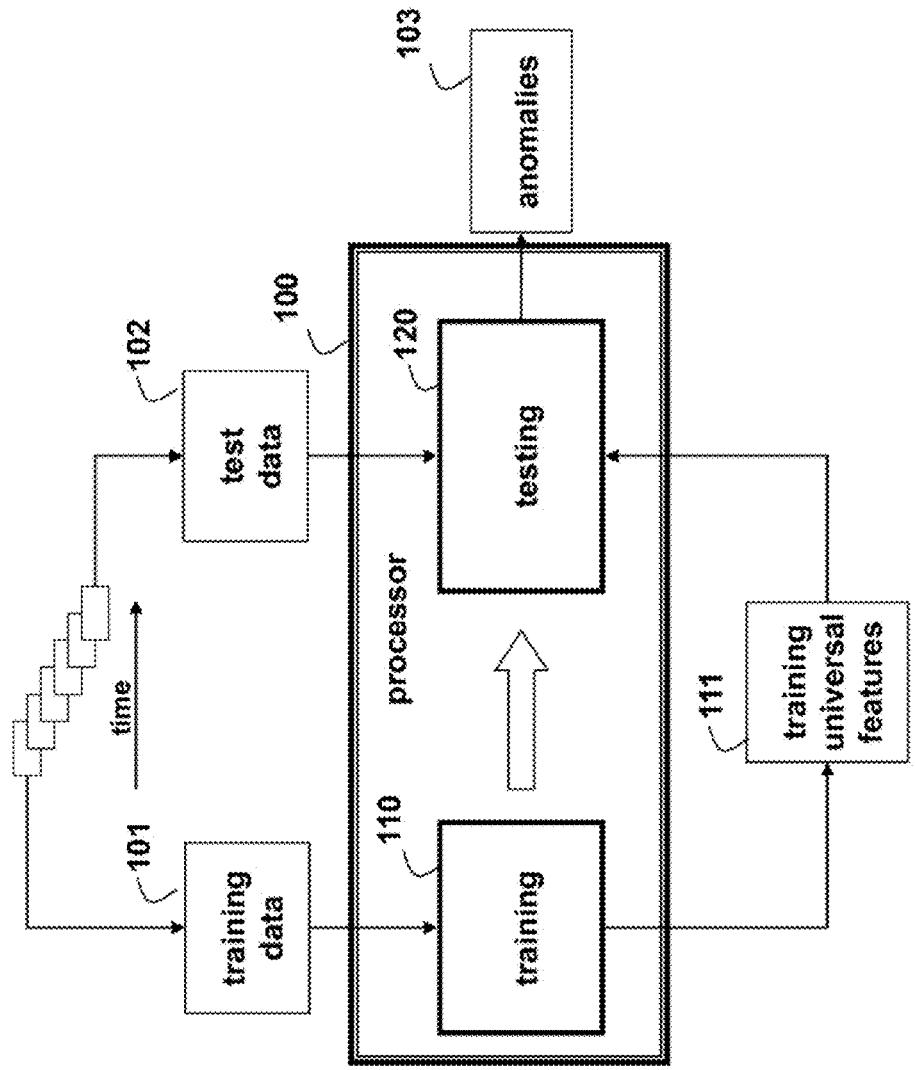
FIG. 2A is a flow diagram of a method for detecting anomalies in time series data according to embodiments of the invention.

As shown in FIG. 2A, the embodiments of our invention provide a method fir detecting anomalies in time series data. For example, the data are acquired by sensors from equipment or machines. It should be understood that the method can be used in other applications, such as general statistics, signal processing, pattern recognition, econometrics, finance service, weather forecasting, climatic variations, oceanography, control engineering, communications engineering, medical diagnosis, epidemiology, and market analysis, to name but a few.

The time series data can include training data 101 and testing data. In either case, the time series data are partitioned into overlapping and sliding time windows 103 of length w. A sampling rate, window size, and amount of overlap can be application specific, e.g., for short-term phenomena the windows can be small fractions of seconds. The windows for long-term behavior can be years or centuries. Features are extracted from the windows as follows. The features are universal because the features can represent different types of time series data, e.g., stochastic type, trajectory type and hybrid type that combines characteristics of trajectory- and stochastic-type time series data in a single feature.

During, training, training universal features 111 are extracted 110 from training data, e.g., data that do not contain any anomalies.

During testing, features are extracted and characterized in a similar manner. Then, anomalies 103 in test data 102 are detected 120 by comparing to the learned features, The detection can use distances between the features learned during training and features from the test data.

The Steps of this method and other procedures described herein can be performed in a processor 100 connected to memory and input/output interfaces as known in the art.

Trajectory and Stochastic Features

A universal feature includes two main components: a trajectory component and a stochastic component.

Trajectory Component

The trajectory component describes a smooth trajectory that the time series follows within a window. The trajectory component uses a moving window average, which is equivalent to a low pass filtering of the time series. The trajectory component also includes hounds on the average for the window in each time step that specifies how much variation in the trajectory is typically seen among all similar trajectories in the training data. This is equivalent to placing confidence intervals along the trajectory.

Figure 2B:
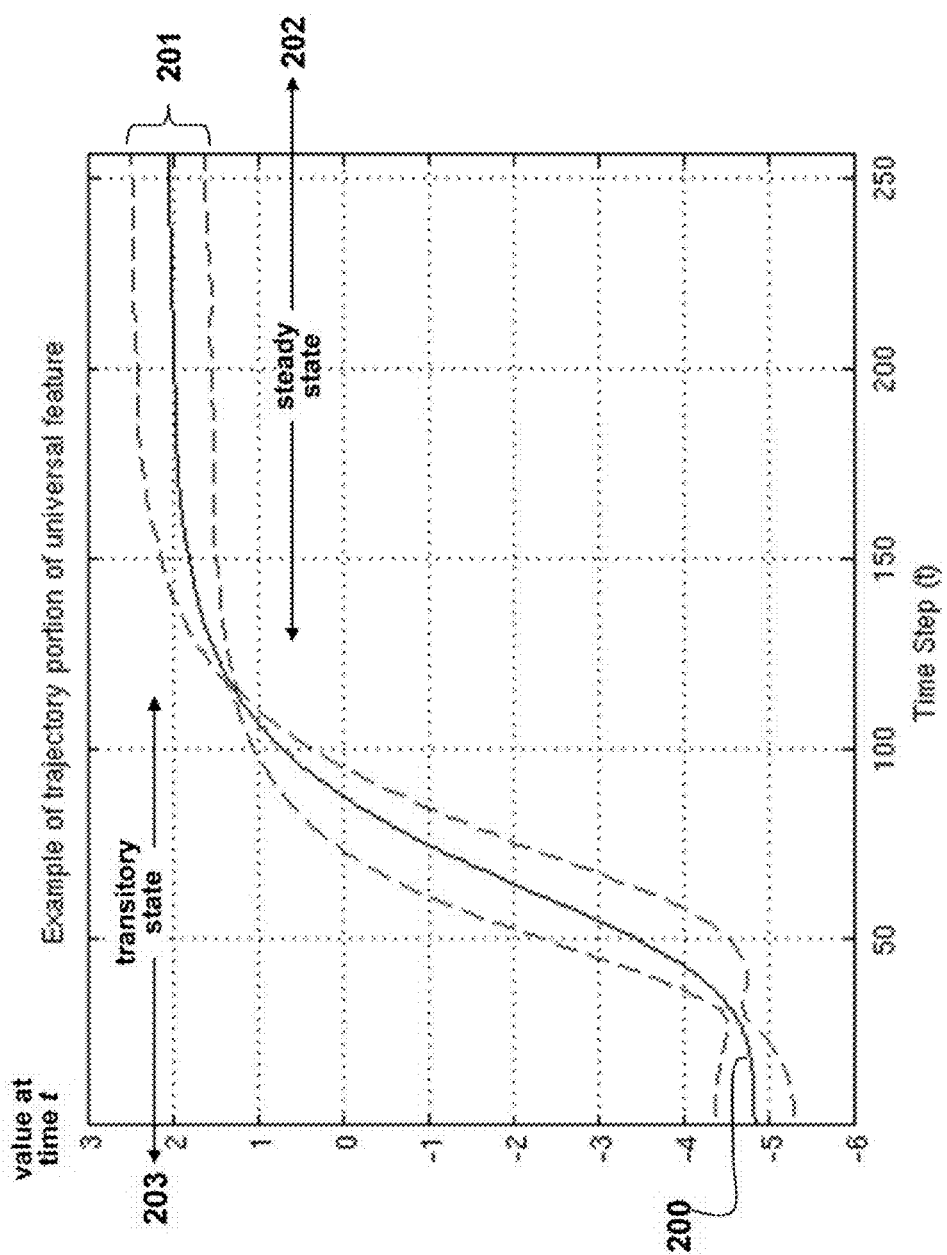
FIG. 2B is a graph of a trajectory component of a universal feature including confidence intervals according to embodiments of the invention.

An example of a trajectory component of a universal feature is shown in FIG. 2B. The trajectory component is represented as a vector of length 2w and includes a moving average 200 and bounds 201 on the average. The trajectory component can be thought of as a mean trajectory, along with intervals describing variations of the trajectory at each time step. The trajectory component characterizes low frequency components of the time series data.

It should be noted, that most prior art methods are only interested in the stochastic behavior of a system that has reached some steady state 202 after startup. In contrast, we are also interested in transitory states 203.

Stochastic Component

The stochastic component of a time series describes fluctuations in the time series data, most likely due to random processes. The stochastic component of a universal feature includes various statistics determined over the time window of the time series data along with the standard deviations of each statistic. The statistics are stored as an N element vector where N is the number of statistics computed. The standard deviations of each statistic are stored as another N element vector for a total of 2N elements, in a preferred embodiment, the statistics of the stochastic component include:
  i. a mean;
  ii. a standard deviation;
  iii. a mean of the absolute value of a first difference, e.g., $z'(t)=z(t)-z(t-1)$;
  iv. number of mean crossings;
  v. percentage of positive values in the first difference;
  vi. a percentage of zero values in the first difference; and
  vii. an average length of a run of positive differences.

Figure 3:
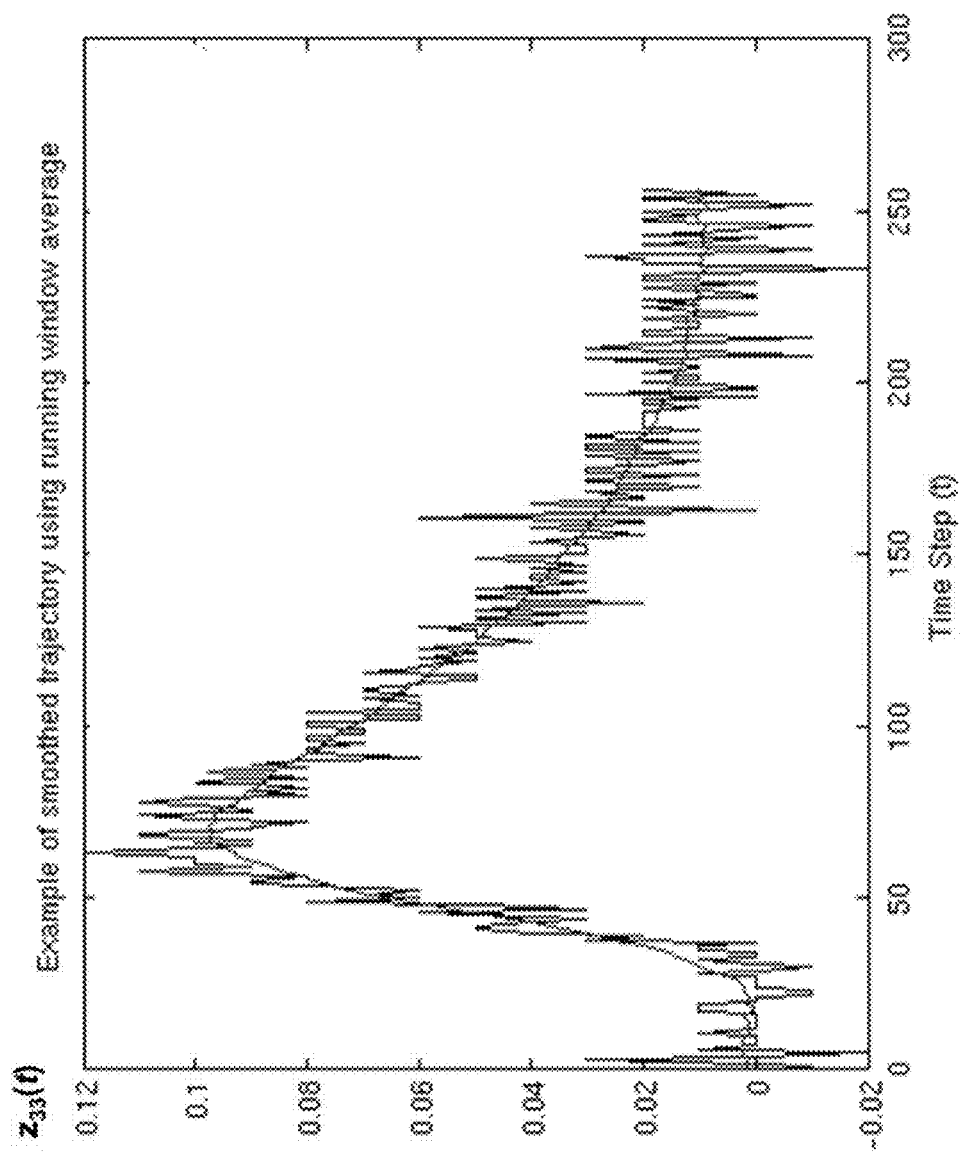
FIG. 3 is a graph of values of a hybrid trajectory type and stochastic type time series data with the trajectory component of the corresponding universal feature overlaid according to embodiments of the invention.

FIG. 3 shows a hybrid-type time series data, with the trajectory component of the corresponding universal feature overlaid.

Training

Figure 4:
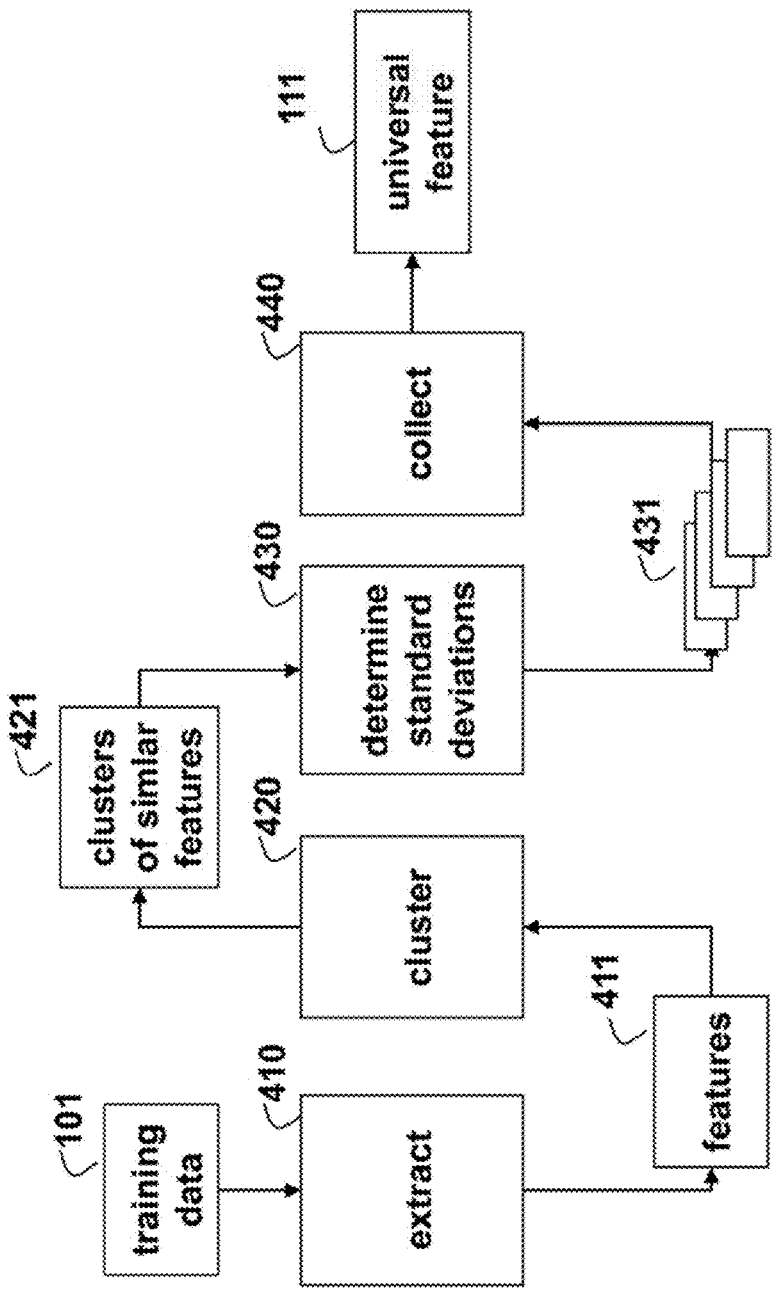
FIG. 4 is a flow diagram of a training method according to embodiments of the invention.

During training as shown in FIG. 4, the universal features 411 are extracted 410 from the training data 101 for the time series. The training data should contain only normal time series data. This is performed by partitioning the time series into overlapping time windows of length w. The universal features, without the associated standard deviations, are determined for each time window.

Then, clusters 421 of similar universal features are determined 420. For each cluster, the standard deviations for each time step of the trajectories as well as the standard deviations of each statistic 431, as described above, are determined 430 to form a universal feature for each cluster. The universal features of the clusters are then collected 440 into a single set of universal features 111 that characterizes the time series data.

Testing

Figure 5:
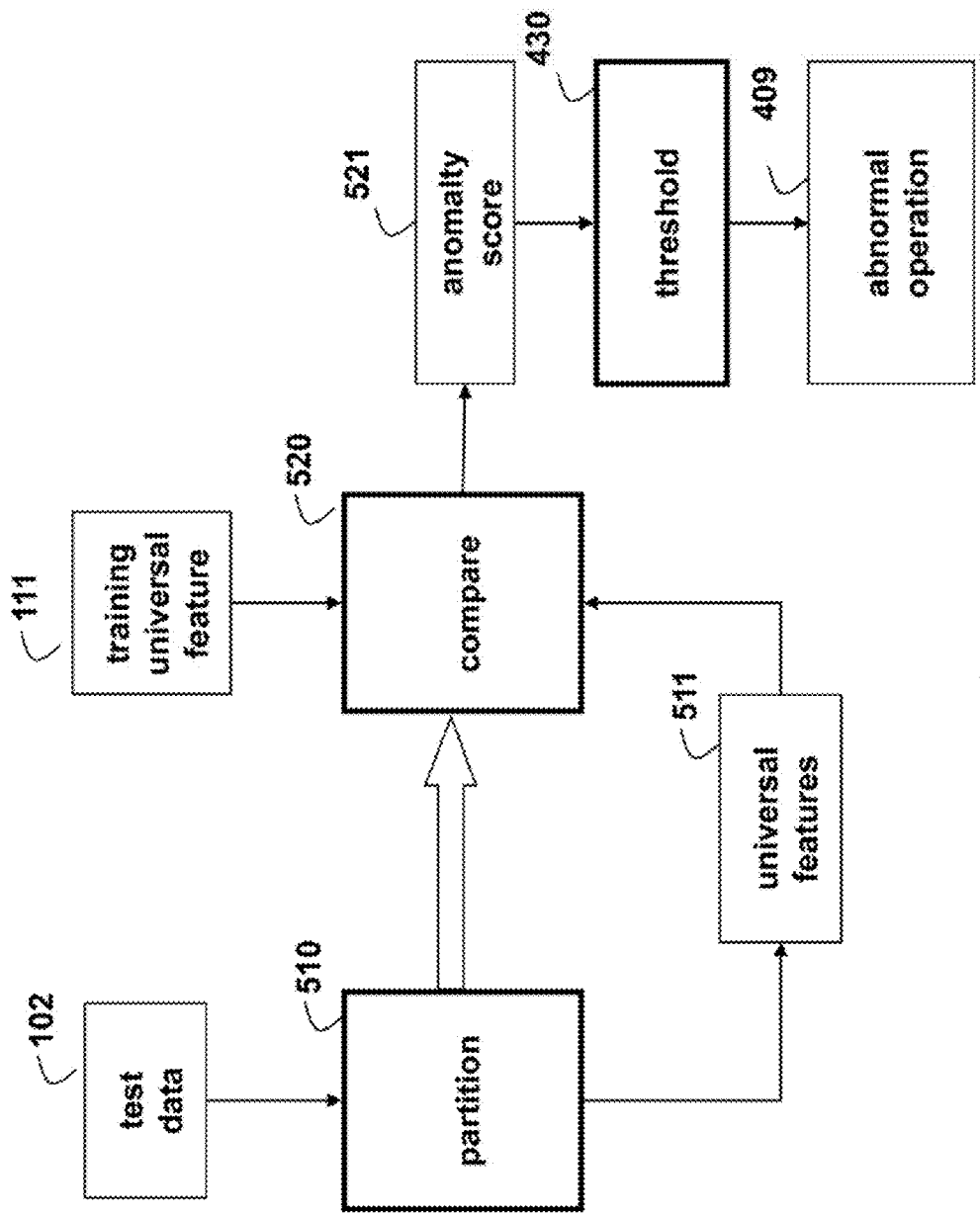
FIG. 5 is a flow diagram of a method for detecting anomalies according to embodiments of the invention.

During testing as shown in FIG. 5, the anomalies 130 are detected in the testing time series data. 102 as follows. The testing time series is partitioned 510 into overlapping time windows of length as during training. The universal feature 511, without the associated standard deviations, is determined for each time window. The universal feature is then compared 520 to the training universal features to determine the most similar feature. The comparison uses a distance metric described below.

Distance Metric

The distance between a training universal feature $fv_1$, for a cluster, which does include standard deviations, and the universal feature $fv_2$ of a single time window in the test data, which does not include standard deviations, is determined according to:

$$Dist(fv_1, fv_2) = \sum_{t=1}^{w} \max(0, |\mu_1(t) - \mu_2(t)| - 3\sigma_1(t)) + \sum_{i=1}^{7} \max(0, |m_1(i) - m_2(i)| - 3s_1(i))$$

where $\mu_1$ is the trajectory component of $fv_1$, $\sigma_1$ is the vector of standard deviations of the trajectory component of $fv_1$, $m_1$ is the vector of statistics of $fv_1$, and $s_1$ is the vector of standard deviations for the statistics of $fv_1$. Similarly, $\mu_2$ is the trajectory component of the universal feature of the single time window $fv_2$, and $m_2$ is the vector of statistics of $fv_2$.

This formula measures the distance of the trajectory of $fv_2$ outside three standard deviations from the trajectory of $fv_1$ plus the distance of the statistical components off $fv_2$ outside three standard deviations from each statistic of $fv_1$.

The minimal such distance between the testing universal feature and the training universal features is the anomaly score 521 for that time window. If the anomaly score is greater than some threshold 430, then testing time window is associated with an anomalous operation.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for detecting anomalies in time series data, comprising the steps of:
   partitioning the time series data into overlapping and sliding time windows;
   determine features for each window;
   clustering features of similar windows to obtain universal features, wherein the universal feature includes a stochastic component, wherein statistics of the stochastic component include a mean, a standard deviation, a mean of an absolute value of a first difference, a number of mean crossings, a percentage of positive values in the first difference, a percentage of zero values in the first difference, and an average length of a run of positive differences of the time series data in the window, and standard deviations of the statistics;

comparing the universal features extracted from testing time series data with the universal features acquired from training time series data to determine a score, wherein the universal features characterize trajectory components of the time series data and stochastic components of the time series data; and detecting an anomaly if the anomaly score is above a threshold, wherein the steps are performed in a processor.

2. The method of claim 1, wherein the time series data are acquired from a machine by a sensor.

3. The method of claim 1, wherein the trajectory component is represented by a smooth curve, and the stochastic component is represented by random fluctuations around the smooth curve.

4. The method of claim 1, wherein a trajectory component of the universal feature includes moving means and bounds of the means of the time series data.

5. The method of claim 1, wherein a trajectory component of the universal feature characterizes low frequency components of the time series data.

6. The method of claim 1, wherein a stochastic component of the universal feature characterizes high frequency components of the time series data.

* * * * *